Dec. 12, 1967  J. F. KAHLENBERG  3,357,606
FLUID FLOW ADJUSTMENT DEVICE FOR MANIFOLDED DISPENSING NOZZLES
Filed June 18, 1965
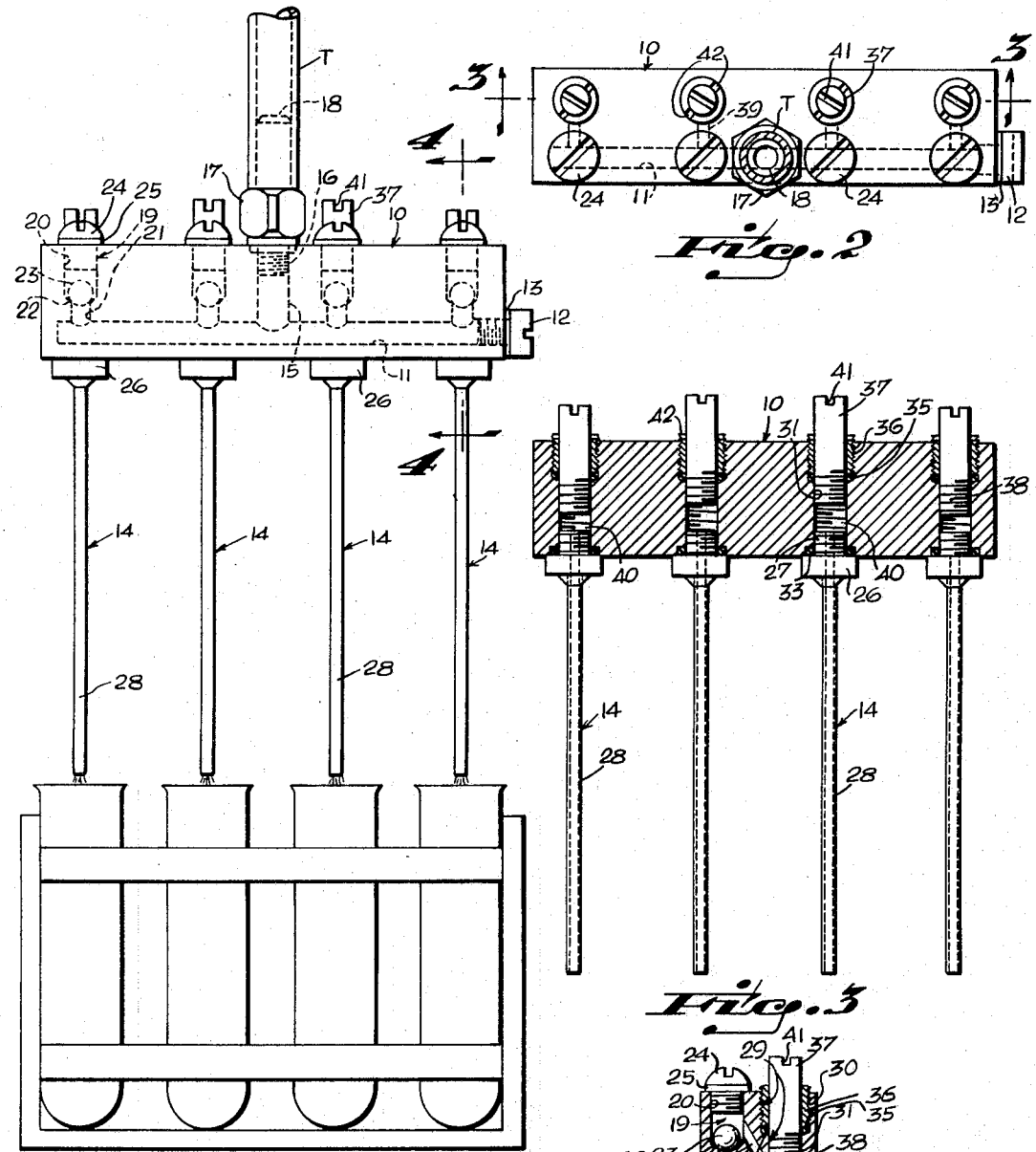
INVENTOR.
JAMES F. KAHLENBERG
BY E. H. Schmidt
ATTORNEY.

United States Patent Office 3,357,606
Patented Dec. 12, 1967

3,357,606
FLUID FLOW ADJUSTMENT DEVICE FOR MANIFOLDED DISPENSING NOZZLES
James F. Kahlenberg, P.O. Box 2803,
Sarasota, Fla. 33578
Filed June 18, 1965, Ser. No. 464,897
6 Claims. (Cl. 222—486)

ABSTRACT OF THE DISCLOSURE

A method and means for adjustably controlling the rate of flow of fluid under pressure from a common source through a plurality of dispensing nozzles by individually varying fluid friction in flow path chambers communicating between a common manifold and each of the dispensing nozzles, including check valves in the paths of flow through said chambers to prevent siphonage between the dispensing nozzles through the manifold.

---

This invention relates to fluid dispensing devices and is directed particularly to an improved fluid flow adjustment means permitting precise metering at each individual dispensing nozzle of a plurality of dispensing nozzles fed from a common manifold.

In the packaging of costly liquids such as tissue culture suspensions and the like biological or medical fluids, many of which cost as much as seventy-five dollars or more per cubic centimeter, it is of great importance that the fluid volume required to fill the pumping and dispensing system be kept at a minimum, as this amount of fluid necessarily is wasted at the completion of a dispensing operation. At the same time, in quantity production efficiency requires that a plurality of vials or other containers be filled simultaneously. Attempts to dispense fluids simultaneously through a plurality of nozzles fed from a common manifold supplied with fluid by a single pump to achieve quantity production with minimum wastage heretofore have failed because the requisite precise metering or fluid volume dispensing at each nozzle could not be attained. Failure to achieve satisfactory metering was due partly to siphoning between the nozzles through the common manifold, and partly to the inability to satisfactorily control the flow volume to the nozzles by individual means such as needle valves or the like commonly used for fluid flow control. Such devices either were too sensitive with the result that an equalized or uniform flow at the nozzles was extremely difficult to maintain, or subject to clogging by suspended solids present in the fluid or solution being dispensed. As a result, in the quantity dispensing of such fluids, a plurality of individual pumps and dispensing nozzle systems are generally used, say four to six operating in unison, notwithstanding the considerable wastage of the fluid remaining in all the pumping systems at the completion of a dispensing run.

It is accordingly the principal object of this invention to provide a novel fluid flow adjustment device for dispensing nozzles permitting precise and dependable control without being subject to clogging by particles in suspension, thereby being particularly well suited for use in a manifold dispensing system fed by a single pump.

Another object is to provide a manifold having a plurality of dispensing nozzles each having an individual fluid flow adjusting mechanism permitting flow control over a wide range without siphoning between nozzles through the common manifold, and wherein the internal volume of the flow system is kept to a minimum to minimize fluid waste.

A more particular object is to provide a fluid flow control device including an expansion chamber communicating with a discharge nozzle, and a plug member adjustably received in the expansion chamber, thereby to vary the frictional characteristics of the defining walls of the chamber with respect to fluid flowing therethrough under pressure for discharge through the nozzle. A plurality of such fluid flow control devices in a common manifold permits a given volume of liquid, delivered to the manifold by a single pump, to be precisely divided into equal or unequal parts as desired.

Yet another object is to provide a manifold dispensing system of the character described that is simple in structure, economical to manufacture, easy to use and clean, and which is well suited to the quantity dispensing of precisely metered amounts of fluid simultaneously from each nozzle with the use of a single pump.

Other objects, features and advantages of the invention will be apparent from the following description when read with reference to the accompanying drawings. In the drawings, wherein like reference numerals denote corresponding parts throughout the several views:

FIG. 1 is a rear elevational view of a four nozzle fluid dispensing device embodying the invention shown in use in simultaneously filling four glass vials;

FIG. 2 is a top view of the manifold dispensing device illustrated in FIG. 1;

FIG. 3 is a vertical cross-sectional view taken along the line 3—3 of FIG. 2 in the direction of the arrows; and FIG. 4 is a vertical cross-sectional view taken along the line 4—4 of FIG. 1 in the direction of the arrows.

Referring now in detail to the drawings, the fluid dispensing device embodying the invention comprises an elongated manifold body member 10, which may be of square or approximately square shape and which is preferably of a strong, chemically-resistant, easily machined material such as stainless steel.

The body member 10 is provided, adjacent the rear, lower corner thereof, with a blind longitudinal bore 11 the outer end of which is internally-threaded to receive a plug screw 12 with washer 13 for sealing off said bore. The bore 11 constitutes a manifold passage through which the fluid to be dispensed is fed to multiple nozzles 14 (four in the embodiment illustrated). To this end, the top of the body member 10, at a central position therealong, is provided with a vertical bore 15 communicating at its inner end with the longitudinal bore 11, and internally-threaded at its outer end to receive the threaded stud portion 16 of a connector fitting 17 having an outwardly extending nipple 18 for attachment of a flexible tube T (partially illustrated) leading from the fluid pump feeding the manifold.

The connector fitting 17 is fitted with a gasket in the form of an O-ring, or other suitable sealing means (not illustrated) to prevent leakage at its juncture with the body member 10.

Passageways are provided for directing fluid pumped into the manifold to each of the individual dispensing nozzles 14 while at the same time preventing siphoning between the dispensing nozzle through the common manifold bore 11. To this end, the top of the body member 10, near the back thereof, is provided with vertically-extending bores 19, equidistantly-spaced along the length of said body member, said bores each comprising an outer end portion 20 and an inner end portion 21 of reduced diameter the inner end of which communicates with the longitudinal manifold bore 11. The annular junctures defined by the outer and inner portions 20, 21 of the bores 19 are spherically rounded, as indicated at 22, to provide seats for steel valve balls 23 disposed one each in said bores. The outer ends of the outer portions 20 of the bores 19 are internally-threaded to receive plug screws 24 fitted with suitable sealing washers or gaskets 25.

The nozzles 14 are preferably of stainless steel and comprise an axially bored cylindrical head portion 26 having a reduced diameter, externally-threaded tubular stud portion 27 at one side coaxial with respect to said head portion and in communication with an elongated, rigid, dispensing tube spout portion 28 extending outwardly of the other side of said head portion. The nozzles 14 are removably fitted in bores 29 extending vertically through the body member 10 in front of the vertically-extending bores 19 thereof and in alignment one each therewith. The bores 29 comprise an upper internally-threaded section 30 and a lower internally-threaded section 31 of reduced diameter within which lower section the threaded nozzle stud portions are received. The lower ends of the lower bore sections 31 are counter-sunk to provide annular recesses 32 within each of which is fitted an O-ring 33 for sealing off the undersides of the nozzle head portions 26 to prevent leakage.

The transition zone between the upper and lower internally-threaded sections of each of the bores 29 is defined by an annular seat 34 seated upon which is an O-ring 35. Threadedly received within the upper internally-threaded section 30 of each of the bores 29 is a tubular, externally-threaded packing gland bushing 36 the lower end of which seats against the O-ring 35. Extending through the packing gland bushing 36 is a cylindrical adjusting screw 37, the lower end of said adjusting screw being externally-threaded, as indicated at 38, for adjustable reception within the upper end of the lower internally-threaded section 31 of the bore 29. A small diameter bore 39 extends angularly between each aligned pair of vertically-extending bores 19 and 29, communicating between the outer end portion 20 of the bore 19 just above the ball seat 22, and the lower section of the bore 29 just above the inner end of the stud portion 27 of the nozzle 14. It will be noted that the inner end of the adjusting screw 37 is spaced from the inner end of the nozzle stud portion 27 to provide an expansion chamber 40 with respect to the fluid entering through the inclined, comparatively small diameter bore 39. The volumetric sizes of the expansion chambers 40 are individually controlled by adjustment of the adjusting screws 37, said screws having kerfs 41 in their outer ends to facilitate adjustment by use of a screwdriver. The packing gland bushings 36 seat firmly against their respective O-rings 35 to prevent fluid leakage through the upper end of the vertical bores 29. Adjustment of the packing gland bushings 36 can readily be made by a suitable spanner tool engageable in the opposed slots 42 provided at the upper ends of said bushings.

In operation, fluid being pumped through the tubing T to the device will flow through the longitudinal manifold bore 11 and up through each of the vertical bores 19, unseating the valve balls 23 in its upward passage. The balls 23 seat by gravity on their respective annular seats 22 to serve as check valves preventing reverse flow of the fluid, and thereby preventing siphoning between the nozzles 14. Flow rate is controlled by adjustment of the volumetric size of the expansion chambers 40 by means of the adjusting screws 37, as hereinabove described. It has been found that increasing the size of the expansion chamber 40 results in an increased flow rate through the nozzle spout and, conversely, when its size is decreased, the flow rate through the nozzle spout decreases. This flow change is caused by the change in friction of the fluid as it passes through the expansion chamber in contact with the defining walls thereof. Thus, when the chamber is large, the velocity of flow through the chamber 40 is reduced and friction is reduced, resulting in a greater flow rate. Reducing the size of the chamber 40 increases the velocity of flow, thereby increasing friction and decreasing flow rate. Thus, when the volume delivered by one nozzle is different from the others, a change in the volume of its chamber 40 can be made to effect equalization with the other nozzles. It has been found that for proper operation in controlling flow rate, the flow openings into and out of the chambers 40 must be of substantially reduced size so that the chambers will operate as expansion chambers. To this end the diameter of the inclined bores 39 carrying fluid to the expansion chambers and the diameter of the axial openings in the stud portions 27 of the nozzles 14 are substantially smaller than the diametric size of the expansion chambers 40.

It is to be noted that not only is individual control effected for each nozzle without siphoning between nozzles at flow cut-off, but also that such control is accomplished without the use of restrictive passageways such as needle valves and the like, which would be subject to clogging when dispensing fluids with particles in suspension.

While there is illustrated and described herein only one form in which the invention may conveniently be embodied in practice, it is to be understood that this form is presented by way of example only, and not in a limiting sense. The invention, in brief, comprises all the embodiments and modifications coming within the scope and spirit of the following claims.

What I claim as new and desire to secure by Letters Patent is:

1. In a fluid flow adjustment device for manifolded dispensing nozzles, the combination comprising, a body member having a plurality of interior chambers, a manifold passageway having branch passageways communicating with one each of said chambers for the separate passage of fluid under pressure thereinto from a common source of supply, a nozzle having an outlet passageway communicating with one each of said chambers for the dispensing of fluid outwardly of its associated chamber, and means for individually adjusting the volumetric size of said chambers, the cross-sectional size of said chambers being substantially greater than the cross-sectional size of said branch passageways where they enter their respective chambers, whereby said chambers will act as expansion chambers with respect to fluid passing thereinto, and a check valve in each of said manifold branch passageways to prevent siphoning through said nozzles.

2. A fluid flow adjustment device for manifolded dispensing nozzles as defined in claim 1 wherein said check valves comprise an annular valve seat and a spherical ball gravitationally seated on said valve seat.

3. A fluid flow adjustment device for manifolded dispensing nozzles as defined in claim 1 wherein said chambers are cylindrical in shape and wherein said volumetric size adjusting means comprises cylindrical screws adjustably received one each in threaded openings in one end of said chambers.

4. In a fluid flow adjustment device for manifolded dispensing nozzles, the combination comprising, an elongated body member, a longitudinal bore in said body member for the passage of fluid fed thereinto under pressure, a first plurality of vertically-extending bores in said body member each communicating at one end with said longitudinal bore, a check valve in each of said first plurality of vertical bores, a second plurality of bores in said body member in register one each with said first plurality of bores, a nozzle member secured to one end of each of said second plurality of bores and including a passageway defined by a spout for the outward passage of fluid from its associated second bore, an inclined bore extending between the other end of each of said first plurality of bores and its associated second bore, and an adjustment member adjustably received in the other end of each of said second plurality of bores for varying the volumetric capacity of the chamber therein defined by said nozzle member at one end and said adjustment member at the other end, the cross-sectional size of each of said inclined bores being substantially smaller than that of said chambers defined by said second plurality of bores whereby said chambers act as expansion chambers with respect to fluid flowing thereinto through said inclined bores.

5. A fluid flow adjustment device for manifolded dispensing nozzles as defined in claim 4 wherein said adjustment members each comprise a cylindrical screw adjustably received one each in said other end of said second plurality of bores, said second plurality of bores being internally-threaded for threadably receiving said screws.

6. A fluid flow adjustment device for manifolded dispensing nozzles as defined in claim 5 wherein said check valve comprises an annular valve seat and a spherical ball gravitationally seated on said valve seat.

References Cited

UNITED STATES PATENTS

| 670,395 | 3/1901 | Champ | 141—236 |
| 2,218,852 | 10/1940 | Mandle | 222—486 |
| 2,297,011 | 9/1942 | Mooney | 222—430 |
| 3,065,887 | 11/1962 | Matejek | 222—440 |

ROBERT B. REEVES, *Primary Examiner.*

N. L. STACK, *Assistant Examiner.*